US010607576B2

(12) United States Patent
Okamoto

(10) Patent No.: US 10,607,576 B2
(45) Date of Patent: Mar. 31, 2020

(54) DISPLAY DEVICE, AND CONTROL METHOD FOR DISPLAY DEVICE

(71) Applicant: SHARP KABUSHIKI KAISHA, Sakai, Osaka (JP)

(72) Inventor: Takuya Okamoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/090,216

(22) PCT Filed: Mar. 29, 2017

(86) PCT No.: PCT/JP2017/012788

§ 371 (c)(1),
(2) Date: Sep. 29, 2018

(87) PCT Pub. No.: WO2017/170630

PCT Pub. Date: Oct. 5, 2017

(65) Prior Publication Data

US 2019/0114997 A1 Apr. 18, 2019

(30) Foreign Application Priority Data

Apr. 1, 2016 (JP) ................................ 2016-074648

(51) Int. Cl.
*G06F 1/00* (2006.01)
*G09G 5/397* (2006.01)
(Continued)

(52) U.S. Cl.
CPC ............. *G09G 5/397* (2013.01); *G09G 5/006* (2013.01); *G09G 5/12* (2013.01); *G09G 5/393* (2013.01);
(Continued)

(58) Field of Classification Search
CPC .......... G09G 5/18; G09G 5/397; G09G 5/393; G09G 3/00
See application file for complete search history.

(56) References Cited

U.S. PATENT DOCUMENTS

2005/0105001 A1 5/2005 Yui et al.
2014/0184611 A1* 7/2014 Wyatt ...................... G09G 3/36
345/501
(Continued)

FOREIGN PATENT DOCUMENTS

JP 2005-124167 A 5/2005
JP 2011-135319 A 7/2011
(Continued)

*Primary Examiner* — Michael A Faragalla
(74) *Attorney, Agent, or Firm* — ScienBiziP, P.C.

(57) ABSTRACT

To achieve prompt display of image data to be displayed as well as seamless display of consecutive image data, a host (10) of a display device (1) includes an image generation section (11) configured to generate image data and an image transferring section (12) configured to transfer the image data to a display control section. The image generation section is configured to: start generating, in a case where generation of image data was completed within less than a single unit period, image data for a subsequent frame after the single unit period has passed since the generation of the image data; and start generating, in a case where the generation of the image data was not completed within less than the single unit period, image data for a subsequent frame any time after completion of the generation of the image data.

11 Claims, 12 Drawing Sheets

(51) Int. Cl.
*G09G 5/00* (2006.01)
*G09G 5/12* (2006.01)
*G09G 5/393* (2006.01)

(52) U.S. Cl.
CPC ..... *G09G 2310/04* (2013.01); *G09G 2360/18* (2013.01)

(56) References Cited

U.S. PATENT DOCUMENTS

| | | | | |
|---|---|---|---|---|
| 2014/0375624 | A1* | 12/2014 | Kanoh | G09G 5/18 345/213 |
| 2015/0009224 | A1 | 1/2015 | Tanaka et al. | |

FOREIGN PATENT DOCUMENTS

| | | | |
|---|---|---|---|
| JP | 2013-213912 | A | 10/2013 |
| JP | 2015-004885 | A | 1/2015 |
| WO | 2013/140980 | A1 | 9/2013 |

* cited by examiner

DISPLAY DEVICE, AND CONTROL METHOD FOR DISPLAY DEVICE

TECHNICAL FIELD

The present invention relates to a display device.

BACKGROUND ART

There exists a display device which reads out image data written in a frame memory and transfers the image data thus read out to a display panel such as an LCD (Liquid Crystal Display). In a case where image data is transferred from a host processor (hereinafter referred to simply as "host") to the display panel such as the LCD, the image data is typically first stored temporarily in the frame memory of an LCDC (LCD Controller), and is then outputted to the display panel. Accordingly, while the image is not changed, transfer of image data from the host to the frame memory can be stopped, and display on the display panel can continue to be carried out with use of the image data which is already stored in the frame memory.

However, in a case where a process of writing image data into the memory and a process of reading out the image data from the memory are carried out substantially simultaneously in the display device having the above-described arrangement, one of the writing process and the reading process may overtake the other while the other is still being carried out, due to, for example, a difference in speed between the writing process and the reading process. In this case, image data that is read before the overtaking is different from image data that is read after the overtaking. As a result, image data outputted to the display panel may contain both a portion of the image which was read before the overtaking and a portion of the image which was read after the overtaking.

Patent Literature 1 discloses a frame rate changing device which temporarily stops writing in a case where the frame rate changing device determines that overtaking between writing and reading will occur.

CITATION LIST

Patent Literature

[Patent Literature 1]
Japanese Patent Application Publication, Tokukai, No. 2005-124167 A (Publication Date: May 12, 2005)

SUMMARY OF INVENTION

Technical Problem

However, the technology disclosed in Patent Literature 1 involves stopping writing image data into a frame memory but does not involve stopping transferring image data from a host to a memory control section. Accordingly, image data which is supposed to be displayed may not be displayed, so that seamless display of moving images may be prevented.

The present invention is accomplished in view of the foregoing problem. An object of the present invention is to provide a display device which promptly displays image data to be displayed and also seamlessly displays consecutive image data.

Solution to Problem

In order to attain the object, a display device in accordance with one aspect of the present invention is a display device including: a host configured to transfer image data to a display control section; and the display control section configured to control display of the image data, the host including: an image generation section configured to generate the image data; and an image transferring section configured to transfer, to the display control section, the image data generated by the image generation section, a single frame period with respect to a predetermined refresh rate being a single unit period, the image generation section being configured to, upon completion of generation of the image data, start generating, in a case where the generation of the image data for a single frame was completed within less than the single unit period, image data for a subsequent frame after the single unit period has passed since the generation of the image data for the single frame was started, and start generating, in a case where the generation of the image data for a single frame was not completed within less than the single unit period, image data for a subsequent frame any time after the completion of the generation of the image data for the single frame.

In order to attain the object, a method, in accordance with one aspect of the present invention, for controlling a display device is a method for controlling a display device, the display device including: a host configured to transfer image data to a display control section; and the display control section configured to control display of the image causing the host to generate the image data; and an image transfer step of causing the host to transfer, to the display control section, the image data generated through the image generation step, a single frame period with respect to a predetermined refresh rate being a single unit period, the image generation step being configured to, upon completion of generation of the image data, start generating, in a case where the generation of the image data for a single frame was completed within less than the single unit period, image data for a subsequent frame after the single unit period has passed since the generation of the image data for the single frame was started, and start generating, in a case where the generation of the image data for a single frame was not completed within less than the single unit period, image data for a subsequent frame any time after the completion of the generation of the image data for the single frame.

Advantageous Effects of Invention

The one aspects of the present invention allow achieving prompt display of image data to be displayed as well as seamless display of consecutive image data.

DESCRIPTION OF EMBODIMENTS

[Embodiment 1]

The following description will discuss Embodiment 1 of the present invention in detail with reference to FIGS. 1 through 5.

<Configuration of Display Device>

Figure 1:
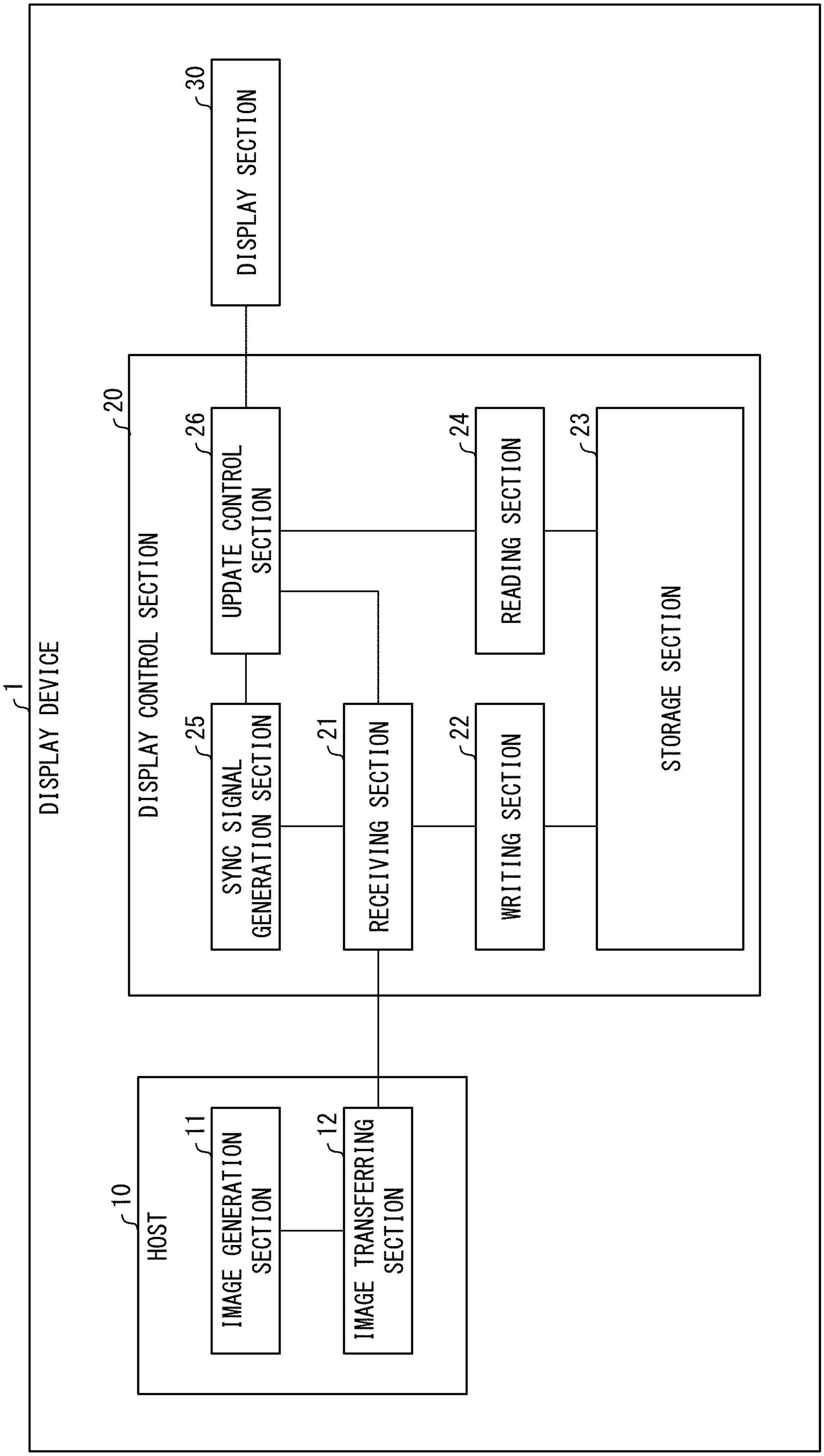
FIG. 1 is a block diagram illustrating an example of main parts of a display device 1 in accordance with Embodiment 1 of the present invention.

With reference to FIG. 1 the following provides a general description of a display device 1 in accordance with Embodiment 1 FIG. 1 is a block diagram illustrating an example of main parts of the display device 1 in accordance with Embodiment 1. As illustrated in FIG. 1, the display device 1 includes a host 10, a display control section 20, and a display section 30. The display device 1 is a display device which omits unnecessary refresh in accordance with whether or not an image is to be updated. That is, the display device 1 has a varying refresh rate.

The host 10 generates image data to be displayed next by the display device 1, and transfers the image data thus generated to the display control section 20. The host 10 includes an image generation section 11 and an image transferring section 12. Note that the host 10 generates and transfers image data at timing determined by the host 10 itself, not at timing indicated by the display control section 20.

The display control section 20 controls display of the display device 1, and includes a receiving section 21, writing section 22, a storage section 23, a reading section 24, a sync signal generation section 25, and an update control section 26. Each section of the display control section 20 may be realized, for example, by a circuit. In a case where image data is transferred from the host 10 to the display control section 20, the display control section 20 first temporarily stores the image data in the storage section 23. Further, the display control section 20 generates a vertical sync signal (Vsync), which is a signal for driving the display section 30, and supplies, to the display section 30, the vertical sinc signal and image data read out from the storage section 23. In this manner, the display control section 20 controls display of the display section 30. Further, the display control section 20 carries out a display refresh on the display section 30 at appropriate timing. Note that the display device 1 differs from display devices of conventional technologies in that an interval at which the vertical sinc signal is generated is not limited to an integral multiple of a single frame period with respect to a predetermined refresh rate (e.g., 120 Hz, 60 Hz, or the like), and can change appropriately. For example, in a case where the display control section 20 and the display section 30 are capable of operating at a maximum refresh rate of 120 Hz, a single frame period is 1/120 second.

The display section 30 displays image data under control of the display control section 20. The display section 30 includes a display screen having a plurality of pixels. The display section 30, for example, is constituted by an oxide semiconductor liquid crystal display panel which serves as an active matrix liquid crystal display panel. The oxide semiconductor liquid crystal display panel is a liquid crystal display panel in which an oxide semiconductor-TFT (thin film transistor) is used for a switching element which is provided so as to correspond to every predetermined number (wherein the number is 1 or greater) of the plurality of pixels which are arranged two-dimensionally. The oxide semiconductor-TFT is a TFT in which an oxide semiconductor is used in a semiconductor layer. Examples of the oxide semiconductor include an oxide semiconductor (InGaZnO-based oxide semiconductor) in which an oxide of indium, gallium, and zinc is used. According to the oxide semiconductor-TFT, an amount of electric current flowing in an on state is large, and an amount of leak electric current in an off state is small. Accordingly, the use of the oxide semiconductor-TFT for the switching element enables an increase in pixel aperture ratio and a reduction in refresh rate of image display to approximately 1 Hz.

The image generation section 11 generates image data to be displayed by the display device 1. Single image data represents an image for a single frame. The image generation section 11 outputs an image which has been generated to the image transferring section 12. When the image transferring section 12 starts transferring image data for a frame, the image generation section 11 starts generating image data for a subsequent frame. The image transferring section 12 transfers image data which has been generated to the display control section 20. When generation of image data is completed, the image transferring section 12 starts transferring the image data.

The receiving section 21 receives image data from the image transferring section 12. The receiving section 21 outputs the image data thus received to the writing section 22. The writing section 22 writes image data into the storage section 23. The storage section 23 stores therein image data transferred from the host 10. Note that the storage section 23 is a frame memory which has a region in which image data for a single frame is stored, and when the host 10 transfers new image data, the data in the region is overwritten. The reading section 24 reads out image data from the storage section 23. The reading section 24 outputs image data to the update control section 26. When image data starts to be transferred from the host 10, the sync signal generation section 25 generates a control signal, which is a signal for driving the display section 30, and supplies the control signal to the update control section 26. The control signal includes, for example, a vertical sinc signal (Vsync), a horizontal sync signal, a clock signal, and the like. On the basis of the vertical sinc signal, the update control section 26 instructs the reading section 24 as to timing at which image data is to be read out. The update control section 26 supplies image data, which has been read out from the storage section 23, and the control signal to the display section 30.

<General Description of Operation of Display Device>

Figure 2:
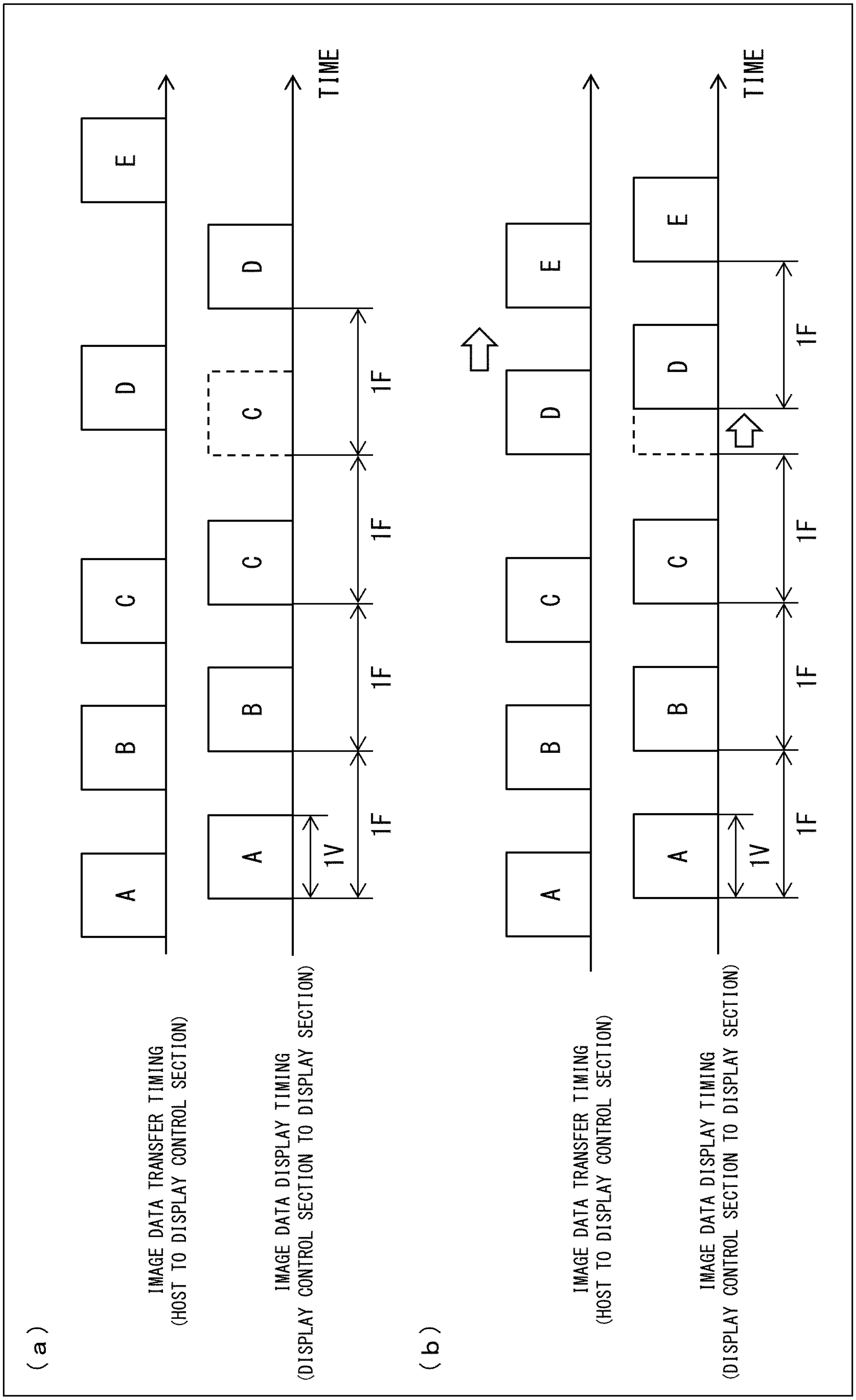
FIG. 2 is a view illustrating how the display device 1 in accordance with Embodiment 1 of the present invention differs from a display device of conventional technology.

With reference to FIG. 2, the following describes display control carried out by the display device 1 in accordance with Embodiment 1. FIG. 2 is a view illustrating how the display device 1 in accordance with Embodiment 1 differs from a display device of conventional technology. Horizontal axes in FIG. 2 represent time. FIG. 2 includes views titled "image data transfer timing" and views titled "image data display timing". The views "image data transfer timing" show timing at which the host 10 transfers, to the display control section 20, image data which the host 10 has generated. The views "image data display timing" show timing at which the display control section 20 causes the display section 30 to display image data. In the examples illustrated in FIG. 2, the host 10 sequentially generates five image data A through E and transfers the five image data A through E to the display control section 20. The display control section 20 reads out image data from the storage section 23 and causes the display section 30 to display the image data at predetermined timing.

(a) of FIG. 2 represents an example of display control carried out in a display device of conventional technology. In the display device of the conventional technology, as shown in the "image data display timing" view, the display control section reads out image data from the storage section every single frame period with respect to a predetermined refresh rate of the display section, and displays the image data on the display section. Note that 1 V represents a single vertical period, and 1 F represents a single frame period. Note here that in a case where timing at which the image data D is transferred from the host to the display control section is delayed for some reason, display timing for displaying image data arrives before writing of the image data D into the storage section is started. As such, the display device of the conventional technology ends up displaying the image data C again on the display section, as indicated by a dotted line. Further, since an interval at which the display device of the conventional technology performs display is every single frame period, timing at which the image data D is displayed on the display section is further delayed.

(b) of FIG. 2 represents an example of display control carried out in the display device 1 in accordance with Embodiment 1. In the display device 1 in accordance with Embodiment 1, timing at which the display control section 20 generates a vertical sinc signal is not limited to an interval of an integral multiple of a single frame period with respect to a predetermined refresh rate of the display section 30. The display control section 20 generates the vertical sinc signal any time, in a case where the display control section 20 receives image data from the host 10. For example, in a case where overtaking between writing of image data into the storage section 23 and reading of image data from the storage section 23 is likely to occur as indicated by a dotted line, the display control section 20 delays timing at which image data is read out (i.e., display timing) to when overtaking is no longer likely to occur. In the example illustrated in (b) of FIG. 2, timing at which display of the image data D is started can be delayed, for example, to when not less than predetermined proportion of a total amount of the image data D has been received by the display control section 20 and written into the storage section 23. Further, generation of image data by the host 10 does not have to be triggered by reception of a sync signal from the display control section 20. Accordingly, even in a case where timing at which image data is transferred is delayed, the host 10 can start generating subsequent image data any time.

Figure 3:
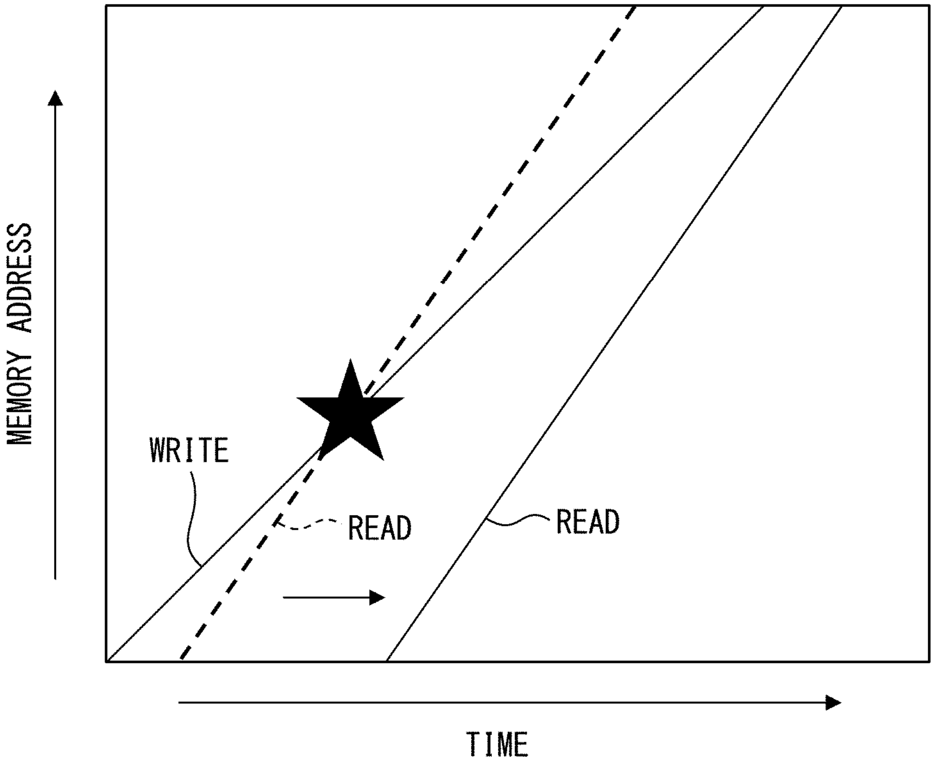
FIG. 3 is a view schematically illustrating display control carried out by the display device 1 in accordance with Embodiment 1 of the present invention.

With reference to FIG. 3, the following describes overtaking between input and output of image data to and from the storage section 23. The display control section 20 inputs and outputs image data along memory addresses in the storage section 23. Writing image data (write operation) and reading image data (read operation) can be carried out in parallel as long as overtaking does not occur. However, a speed of the read operation is higher than that of the write operation in the display device 1. For example, in a case where there is only a small difference between timing at which a write operation is started and timing at which a read operation is started thereafter, overtaking (indicated by a star in FIG. 3) occurs between the write operation (indicated by a solid line) and the read operation (indicated by a dotted line) while the write and read operations are still being carried out. In order to prevent this, the display control section 20 starts a read operation (indicated by a solid line) after a predetermined proportion of the entire image data has been written so that the read operation does not overtake the write operation.

(Display Refresh)

As used herein, "display refresh" means an operation in which image data which is currently displayed on the display section 30 is updated by being overwritten with image data identical to that image data, in order to prevent deterioration of display of the display section 30. That is, display refresh does not involve a change of an image. For example, in a case where (i) the display control section 20 has not received any image data to be newly displayed from the host 10 and (ii) no display refresh was carried out while a single frame period with respect to a minimum refresh rate of the display section 30 passed, the display control section 20 can carry out a display refresh.

<Flow of Processes Carried Out by Host>

Figure 4:
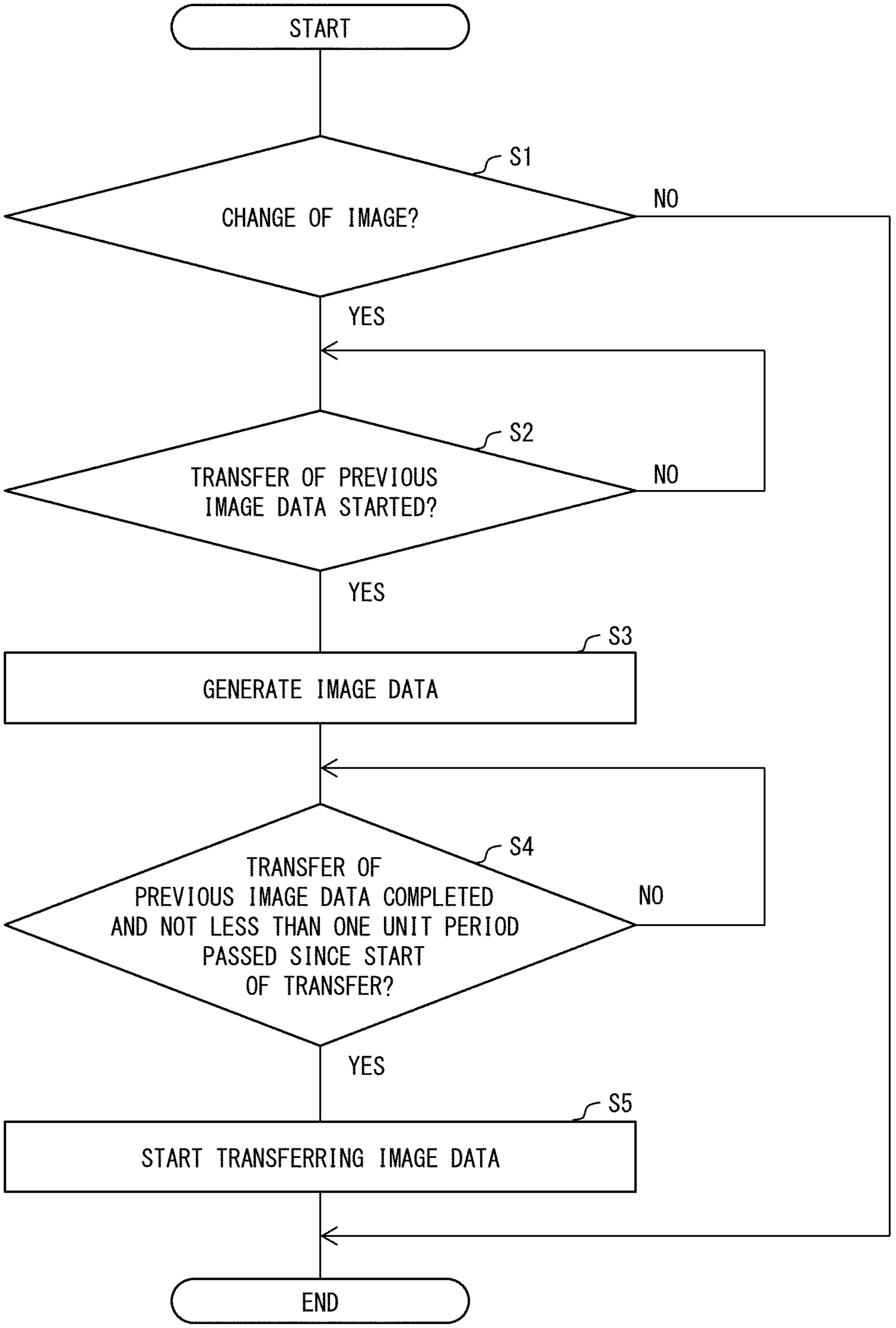
FIG. 4 is a flowchart showing an example of processes carried out by a host 10 of the display device 1 in accordance with Embodiment 1 of the present invention.

FIG. 4 is a flowchart showing an example of a flow of processes carried out by the host 10. The image generation section 11 determines whether or not it is necessary to generate new image data (S1). Specifically, in a case where it is necessary to change an image on the display screen, the image generation section 11 determines that it is necessary to generate new image data.

In a case where the image generation section 11 determines that it is not necessary to generate new image data (NO at S1), the image generation section 11 ends the process without generating image data. Note that in a case where there is no need to change the image, the host 10 neither generates nor transfers new image data.

In a case where the image generation section 11 determines that it is necessary to generate new image data (YES at S1), the image generation section 11 determines whether or not transfer, to the display control section 20, of image data which was generated immediately previously has been started (S2). Note that the image generation section 11 determines YES at S2 also in a case where the transfer of the image data which was generated immediately previously has been completed.

In a case where the transfer of the image data which was generated immediately previously has not been started (NO at S2), the image generation section 11 waits until the transfer of the image data which was generated immediately previously is started.

In a case where the transfer of the image data which was generated immediately previously has been started (YES at S2), the image generation section 11 starts generating new image data in accordance with a start of the transfer of the image data which was generated immediately previously (S3; image generation step). The image generation section 11 outputs the new image data thus generated to the image transferring section 12. The image transferring section 12 determines whether or not (i) the transfer of the image data which was generated immediately previously has been completed and not less than a single unit period has passed since the start of the transfer of the image data which was generated immediately previously (S4). Note here that a single unit period means a single frame period with respect to a predetermined refresh rate of the display section 30.

In a case where the transfer of the image data which was generated immediately previously has not been completed or in a case where a single unit period has not passed since the start of the transfer (NO at S4), the image transferring section 12 waits without starting transferring the new image data.

In a case where (i) the transfer of the image data which was generated immediately previously has been completed and (ii) not less than a single unit period has passed since the start of the transfer of the image data generated last (YES at S4), the image transferring section 12 starts transferring the new image data to the display control section 20 any time (immediately) (S5; image transfer step). The host 10 repeats this series of processes.

As described above, while there is no delay in generation of an image, the image transferring section 12 starts transferring new image data to the display control section 20 after at least a single frame period has passed since a start of immediately previous transfer of image data. This allows the display control section 20 and the display section 30 to perform image display at a predetermined refresh rate. Meanwhile, in a case where a delay occurs in generation of image data due to, for example, excessive load on the host 10, transfer of the image data is also delayed. Even in this case, the image generation section 11 immediately generates subsequent image data without being restricted to the timing of an integral multiple of a single frame period, so that the image transferring section 12 can transfer the subsequent image data.

In a conventional display device, generation or transfer of new image data is started after an interval of an integral multiple of a single frame period has passed since a start of generation or transfer of previous image data. This is because the display control section 20 carries out image generation and image transfer in accordance with the timing of a vertical sinc signal which is generated at regular intervals.

By contrast, the display device 1 of Embodiment 1 is configured such that once generation or transfer of previous image data is completed, generation or transfer of new image data can be started at timing when a given length of period (e.g., a period equal to a non-integral multiple of a single frame period) which is not less than a single frame period has passed since a start of the generation or transfer of the previous image data. Accordingly, even in a case where the generation of the previous image data is delayed, the host 10 can immediately generate new image data and transfer the new image data to the display control section 20. This allows the display device 1 to display consecutive image data seamlessly.

Note that when generation of new image data is completed, the image transferring section 12 can immediately start transfer of the new image data, provided that the previous image data is not still being transferred.

<Flow of Processes Carried Out by Display Control Section>

Figure 5:
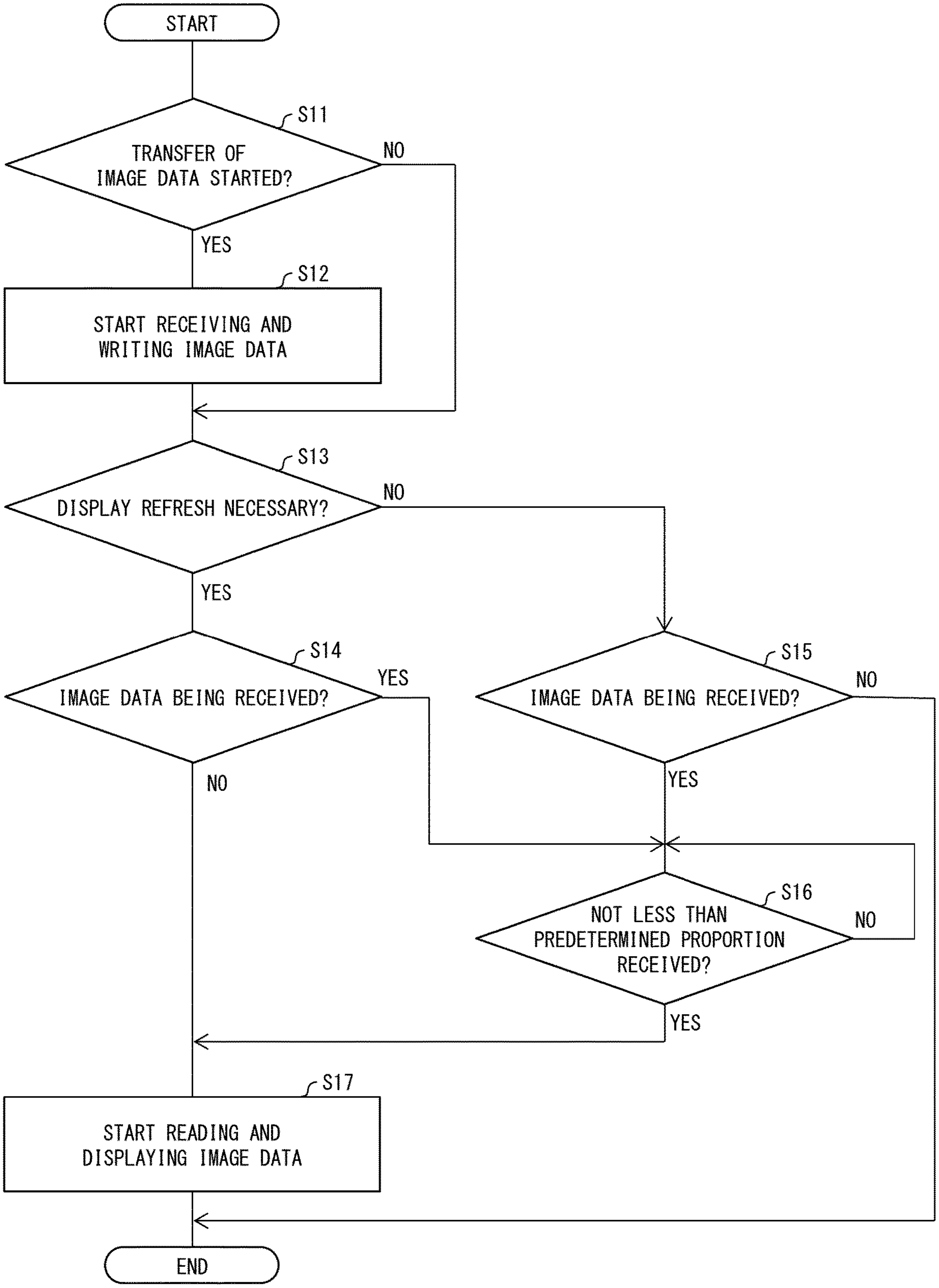
FIG. 5 is a flowchart showing an example of processes carried out by a display control section 20 of the display device 1 in accordance with Embodiment 1 of the present invention.

FIG. 5 is a flowchart showing an example of a flow of processes carried out by the display control section 20. The receiving section 21 determines whether or not transfer of image data from the host 10 has been started (S11).

In a case where the receiving section 21 determines that the transfer has not been started (NO at S11), the process proceeds to S13.

In a case where the receiving section 21 determines that the transfer has been started (YES at S11), the receiving section 21 starts receiving the image data and notifies the sync signal generation section 25 that the receiving section 21 has started receiving the image data. The receiving section 21 writes the image data into the storage section 23 via the writing section 22 (S12). The process proceeds to S13.

At S13, the update control section 26 determines whether or not it is necessary to conduct a display refresh which does not involve changing an image. Specifically, the update control section 26 determines whether or not (i) no image data is being transferred from the host 10 and (ii) a predetermined period (e.g., 1 second) has passed since the image data was written into the display section 30. The predetermined period is a period during which display of the display section 30 can be maintained without performing a refresh. In other words, the predetermined period is a single frame period (e.g., 1 second) with respect to a minimum refresh rate (e.g., 1 Hz) of the display section 30. Further, the update control section 26 determines whether or not the receiving section 21 is receiving image data from the host 10 S14, S15).

In a case where the update control section 26 determines that (i) a display refresh is necessary (YES at S13) and (ii) the receiving section 21 is not receiving image data (NO at S14), the sync signal generation section 25 generates a vertical sinc signal. Further, the update control section 26 reads, via the reading section 24, image data which is stored in the storage section 23. The update control section 26 supplies the vertical sinc signal and the image data to the display section 30 so that display of the display section 30 is refreshed (S17).

In a case where the update control section 26 determines that (i) no display refresh is necessary (NO at S13) and (ii) the receiving section 21 is not receiving image data (NO at S15), the update control section 26 ends the process.

In a case where the update control section 26 determines that the receiving section 21 is receiving image data (YES at S14 or YES at S15), the update control section 26 determines whether or not less than a predetermined proportion e.g., not less than 1/10) of a total amount of the image data which is being received from the host 10 has been received (S16).

In a case where the update control section 26 determines that less than the predetermined proportion of the total amount of the image data has been received (NO at S16), the update control section 26 waits until not less than the predetermined proportion of the total amount of the image data has been received.

In a case where the update control section 26 determines that not less than the predetermined proportion of the total amount of the image data has been received (YES at S16), the sync signal generation section 25 generates a vertical sinc signal. Further, the reading section 24 reads out image data which is stored in being written into) the storage section 23. The update control section 26 supplies the vertical sinc signal and the image data to the display section 30 so that the image data is written into the display section 30 (S17). In a case where not less than the predetermined proportion of the image data has been received (written), reading will not overtake writing after the reading section 24 starts reading image data from the storage section 23. The display control section 20 repeats this series of processes.

According to the above processes, in a case where the display control section 20 receives image data from the host 10, the display control section 20 can supply image data to the display section 30 immediately at timing with which no overtaking is expected to occur between writing and reading image data into and from the storage section 23. Further, while no image data is received, the display control section 20 can carry out a display refresh at appropriate timing with which no deterioration of display of the display section 30 occurs.

[Embodiment 2]

Figure 6:
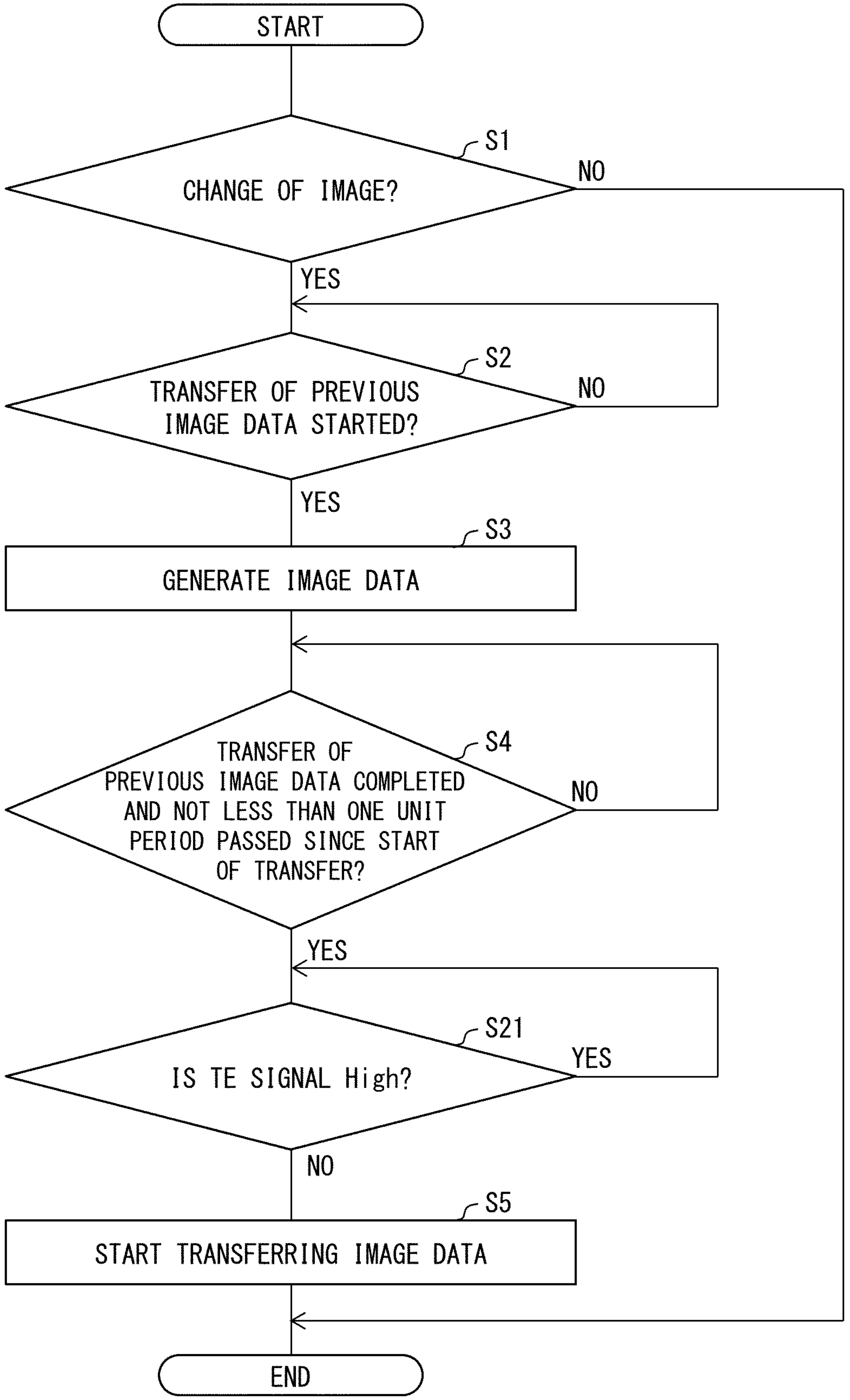
FIG. 6 is a flowchart showing an example of processes carried out by a host 10 of a display device 1 in accordance with Embodiment 2 of the present invention.
Figure 7:
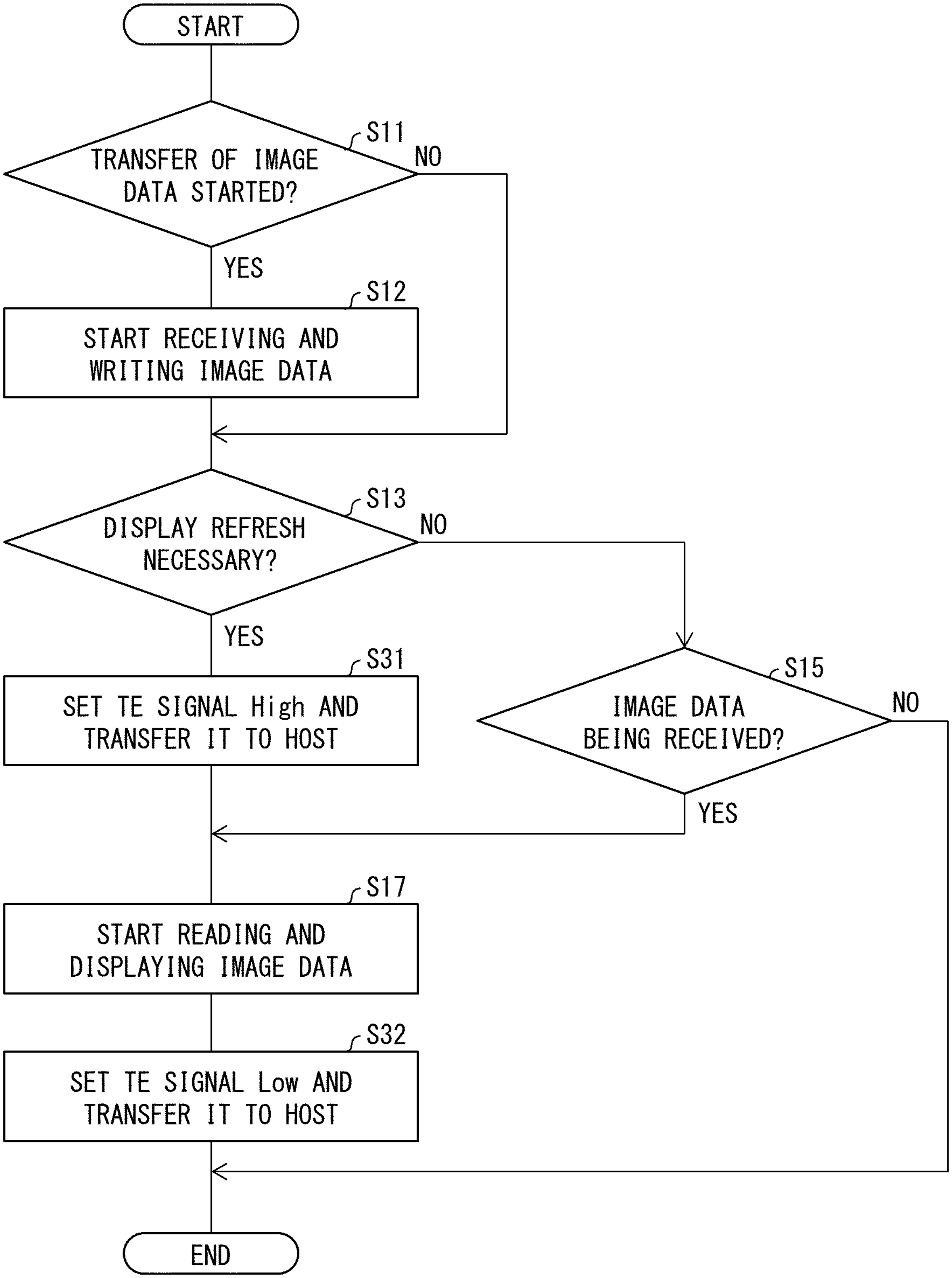
FIG. 7 is a flowchart showing an example of processes carried out by a display control section 20 of the display device 1 in accordance with Embodiment 2 of the present invention.

The following description will discuss Embodiment 2 of the present invention with reference to FIGS. 1, 6, and 7. For easy explanation, the same reference signs will be given to members each having the same function as a member described in Embodiment 1, and descriptions on such a member will be omitted. In Embodiment 2, a display device 1 inhibits transfer of image data from a host 10 to a display control section 20 during a transfer inhibit time period which is set by the display control section 20.

[Configuration of Main Parts of Display Device]

In Embodiment 2, the display device 1 has the same configuration as that illustrated in FIG. 1, but functions of an update control section 26 and an image transferring section 12 partially differ from those of Embodiment 1. That is, in a case where a display refresh, which involves no change of an image, needs to be carried out on a display section 30, the receiving section 21 inhibits new image data from being transferred from the host 10 for a predetermined period (transfer inhibit time period) until the update control section 26 and a reading section 24 start reading image data from a storage section 23. The receiving section 21, for example, transmits, to the image transferring section 12 of the host 10, a transfer timing signal (TE signal) which indicates whether or not image data can be transferred. For example, a "High" value of the transfer timing signal indicates a transfer inhibit time period, and a "Low" value of the transfer timing signal indicates a period during which transfer is possible. The image transferring section 12 inhibits transfer of image data from being started during a transfer inhibit time period which the image transferring section 12 has been notified of from the receiving section 21. Except for this point, the same processes as those of Embodiment 1 are carried out in Embodiment 2.

<Flow of Processes Carried Out by Host>

FIG. 6 is a flowchart showing an example of a flow of processes carried out by the host 10. Processes at S1 through S4 are the same as those in Embodiment 1. In a case of YES at S4, the image transferring section 12 determines whether or not the transfer timing signal received from the display control section 20 is High (S21). In a case where the image transferring section 12 determines that the transfer timing signal received from the display control section 20 is not High (NO at S21), the image transferring section 12 determines that the display device 1 is not in a transfer inhibit time period, and starts transferring the new image data to the display control section 20 any time (immediately) (S5; image transfer step). In a case where the image transferring section 12 determines that the transfer timing signal received from the display control section 20 is High (YES at S21), the image transferring section 12 determines that the display device 1 is in a transfer inhibit time period, and waits until the transfer timing signal turns Low.

<Flow of Processes Carried Out by Display Control Section>

FIG. 7 is a flowchart showing an example of a flow of processes carried out by the display control section 20. Processes at S11 through S13 are the same as those in Embodiment 1. In a case where the update control section 26 determines that a display refresh is necessary (YES at S13), the receiving section 21 transmits a transfer timing signal, which is set High, to the host 10 (S31). The process proceeds to S17. In a case where the update control section 26 determines that no display refresh is necessary (NO at S13), the update control section 26 further determines whether or not image data is being received from the host 10 (S15). In a case where the update control section 26 determines that image data is being received (YES at S15), the process proceeds to S17. In a case where the update control section 26 determines that no image data is being received (NO at S15), the series of processes is ended.

At S17, as with Embodiment 1, the update control section 26 reads out image data from the storage section 23 via the reading section 24, and supplies the image data to the display section 30. Note that the image data read out from the storage section 23 at this stage is (i) identical to image data which is currently displayed on the display section 30, in a case where S17 follows S31 and (ii) image data which has been newly received from the host 10, in a case where S17 follows S15. When the reading section 24 starts reading out the image data, the receiving section 21 turns the transfer timing signal Low (S32).

According to the above processes, the display control section 20 sets a transfer inhibit time period only in a case of carrying out display refresh, so that the display control section 20 can inhibit transfer of image data from the host 10. This allows preventing overtaking between a write operation and a read operation on the storage section 23.

[Embodiment 3]

[Configuration of Main Parts of Display Device]

Figure 8:
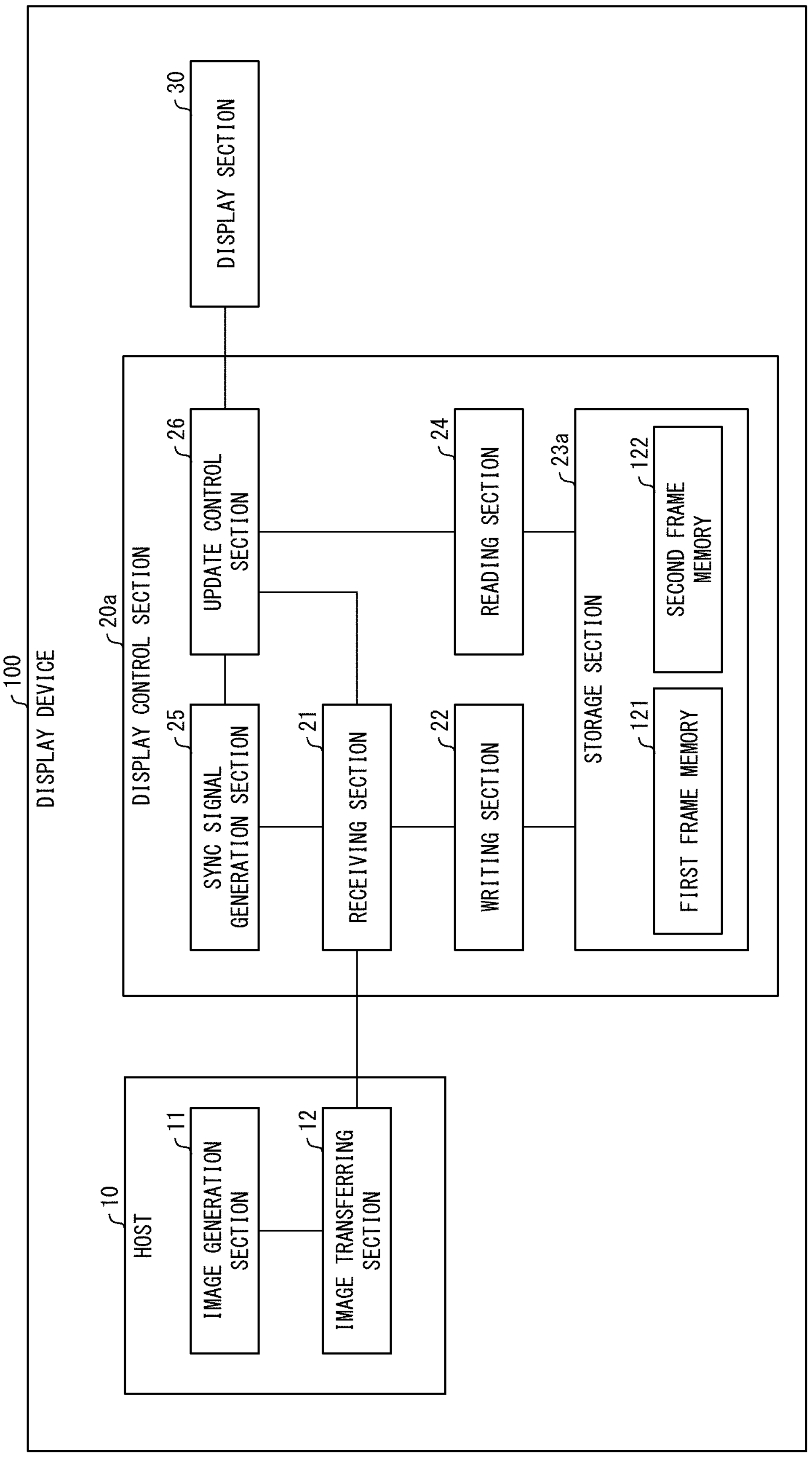
FIG. 8 is a block diagram illustrating an example of a configuration of main parts of a display device 100 in accordance with Embodiment 3 of the present invention.
Figure 9:
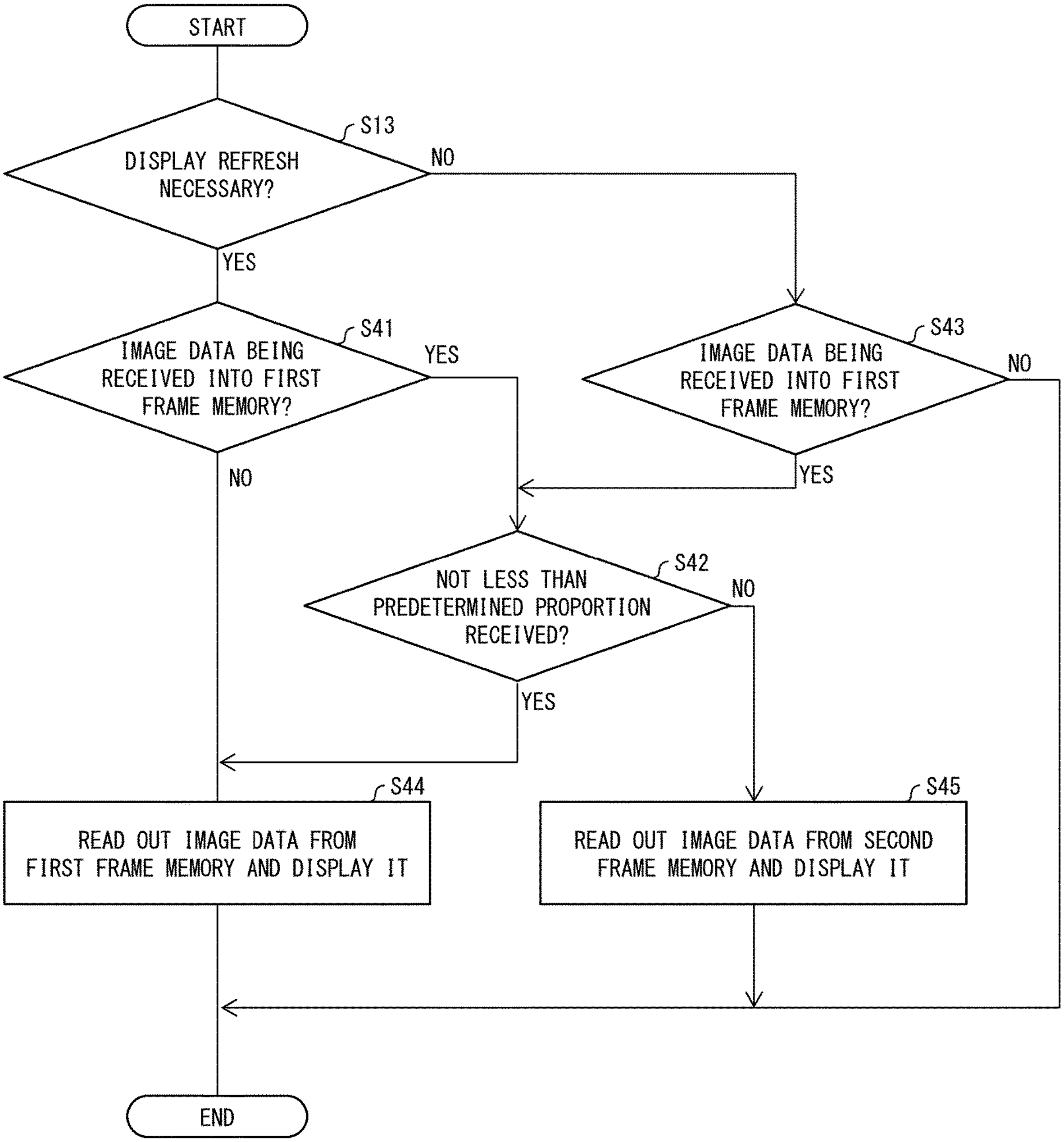
FIG. 9 is a flowchart showing an example of processes carried out by a display control section 20 of the display device 100 in accordance with Embodiment 3 of the present invention.

The following description will discuss Embodiment 3 of the present invention with reference to FIGS. 8 and 9. For easy explanation, the same reference signs will be given to members each having the same function as a member described in Embodiments 1 and 2, and descriptions on such a member will be omitted. In Embodiment 3, a display device whose storage section stores therein image data for two frames will be described.

FIG. 8 is a block diagram illustrating an example of a configuration of main parts of a display device 100. The display device 100 in accordance with Embodiment 3 includes a host 10, a display control section 20*a*, and a display section 30. The display control section 20*a* includes a receiving section 21, a writing section 22, a storage section 23*a*, a reading section 24, a sync signal generation section 25, and an update control section 26. The storage section 23*a* includes a first frame memory 121 and a second frame memory 122. The first frame memory 121 is a memory for storing therein image data for a single frame, and so is the second frame memory 122. The receiving section 21 receives image data from the host 10, and stores the image date in the first frame memory 121 and/or the second frame memory of the storage section 23 via the writing section 22. Note that each image data is stored alternately in the first frame memory 121 or the second frame memory 122. It is also possible to employ a configuration in which the latest image data is always written into the first frame memory 121 and image data immediately previous to the latest image data is written into the second frame memory 122. When updating content displayed on the display section 30, the update control section 26 reads out image data from one of the first frame memory 121 and the second frame memory 122. Apart from the above points, processes carried out by the display control section are the same as those carried out in Embodiment 1. Processes carried out by the host 10 are the same as those carried out in Embodiment 1.

<Flow of Processes Carried Out by Display Control Section>

In FIG. 9, it is assumed that the display device 100 is storing or has stored the latest image data in the first frame memory 121 and has stored, in the second frame memory 122, image data immediately previous to the latest image data. Alternatively, in a case where the latest image data is being stored or has been stored in the second frame memory 122 and image data immediately previous to the latest image data has been stored in the first frame memory 121, all of the processes to be carried out with respect to the first frame memory 121 in FIG. 9 are instead carried out with respect to the second frame memory 122, and vice versa.

The update control section 26 determines whether or not a display refresh on the display section 30 is necessary (S13). In a case where the update control section 26 determines that the display refresh is necessary (YES at S13), the update control section 26 further determines whether or not the display control section 20 is receiving image data into the first frame memory (S41). In a case where the update control section 26 determines that the display control section 20 is not receiving image data (NO at S41), the process proceeds to S44. In a case where the display control section 20 is receiving image data into the first frame memory 121 (YES at S41), the update control section 26 further determines whether or not less than a predetermined proportion (e.g., not less than 1/10) of a total amount of the image data which is being received from the host 10 into the first frame memory 121 has been received (S42). In a case where the update control section 26 determines that not less than the predetermined proportion of the total amount of the image data has been received (YES at S42), the update control section 26 determines that reading will not overtake writing after reading of the image data is started. Thus, the process proceeds to S44. In a case where the update control section 26 determines that less than the predetermined proportion of the total amount of the image data has been received (NO at S42), the update control section 26 determines that reading may overtake writing after the image data in the first frame memory 121 starts being read out. Thus, the update control section 26 reads out the image data from the second frame memory 122 via the reading section 24 so as to cause the display section 30 to display the image data (S45), and ends the process.

Further, in a case of NO at S13, that is, in a case where the update control section 26 determines that no display refresh is necessary, the update control section 26 further determines whether or not the display control section 20 is receiving image data from the host 10 into the first frame memory 121 (S43). In a case where the update control section 26 determines that the display control section 20 is receiving image data (YES at S43), the process proceeds to S42. In a case where the update control section 26 determines that the display control section 20 is not receiving image data (NO at S43), the series of processes is ended.

In a case of NO at S41 or YES at S42, the update control section 26 determines that a certain amount of image data among the latest image data, at which amount no overtaking occurs between input and output, has been written into the first frame memory 121. Accordingly, the update control section 26 reads out the image data from the first frame memory 121 so as to cause the display section 30 to display the image data (S44), and ends the process.

According to the above processes, in a case where the display control section 20 receives image data from the host 10, the display control section 20 can read out image data and cause the image data to be displayed immediately at timing with which no overtaking is expected to occur between input and output of image data. Further, while no image data is received, the display control section 20 can update displayed data at appropriate timing with which no deterioration of display of the display section 30 occurs.

[Embodiment 4]

[Configuration of Main Parts of Display Device]

Figure 10:
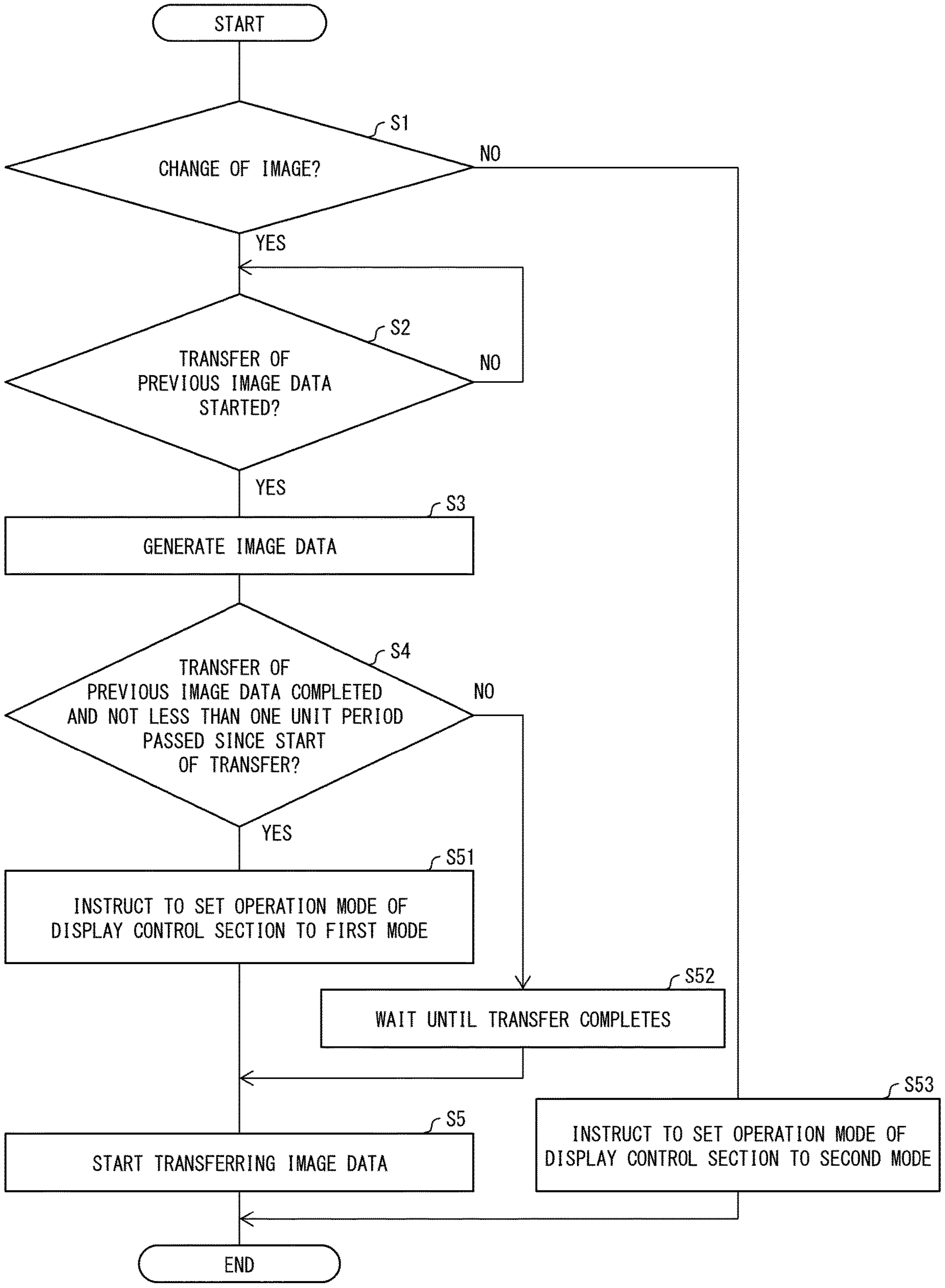
FIG. 10 is a flowchart showing an example of processes carried out by a host 10 of a display device 1 in accordance with Embodiment 4 of the present invention.
Figure 11:
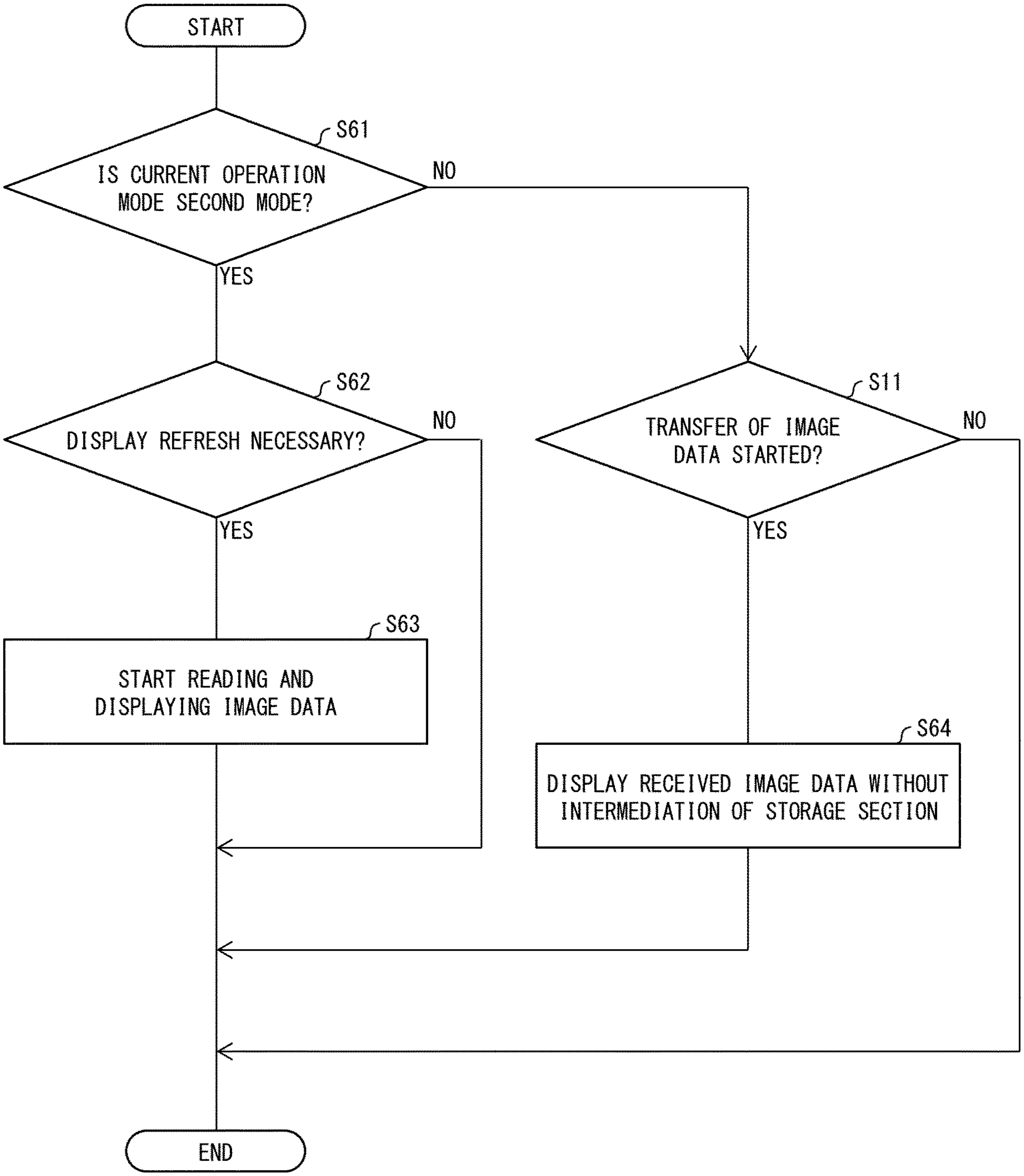
FIG. 11 is a flowchart showing an example of processes carried out by the display control section 20 of the display device 1 in accordance with Embodiment 4 of the present invention.

The following description will discuss Embodiment 4 of the present invention with reference to FIGS. 1, 10, and 11. For easy explanation, the same reference signs will be given to members each having the same function as a member described in Embodiments 1 through 3, and descriptions on such a member will be omitted. In Embodiment 4, a display control section 20 operates between two operation modes of (i) a first mode in which the display control section 20 causes image data to be displayed on a display section 30 without intermediation of a storage section 23 and (ii) a second mode in which the display control section 20 reads out image data from the storage section 23 and causes the image data to be displayed on the display section 30.

In Embodiment 4, the display device 1 has the same configuration as that illustrated in FIG. 1, but functions of an image transferring section 12 and an update control section 26 partially differ from those of Embodiment 1. In a case where there is image data to be transferred, the image transferring section 12 instructs the display control section 20 to switch the operation mode of the display control section 20 to the first mode. In a case where there is no image data to be transferred, the image transferring section 12 instructs the display control section 20 to switch the operation mode of the display control section 20 to the second mode. In the first mode, the display control section 20 supplies image data received to the display section 30 without intermediation of the storage section 23. In the second mode, the display control section 20 reads out image data from the storage section 23 and supplies the image data to the display section 30. Except for this point, the same processes as those of Embodiment 1 are carried out in Embodiment 2.

<Flow of Processes Carried Out by Host>

FIG. 10 is a flowchart showing an example of a flow of processes carried out by the host 10. Processes at S1 through S4 are the same as those in Embodiment 1. In a case of YES at S4, the image transferring section 12 gives an instruction to switch the operation mode of the display control section 20 to the first mode (S51), and the process proceeds to S5. In a case of NO at S4, the image transferring section 12 (*i*) determines that the operation mode of the display control section 20 was already the first mode when transfer of the image data which is currently being transferred was started and (ii) waits until the transfer of the image data which is currently being transferred is ended (S52). The process proceeds to S5. Note that the process at S5 is the same as that in Embodiment 1. In a case of NO at S1, that is, in a case where the image generation section 11 determines that there is no image to be outputted next for display (no change of the image is to be made) (NO at S1), the image transferring section 12 gives an instruction to switch the operation mode of the display control section 20 to the second mode (S53), and the series of processes is ended.

According to the above processes, the host 10 can switch the operation mode of the display control section 20 on the basis of whether or not there is an image to be outputted next for display (whether or not a change of the image is to be made).

<Flow of Processes Carried Out by Display Control Section>

FIG. 11 is a flowchart showing an example of a flow of processes carried out by the display control section 20. First, the update control section 26 determines whether or not the current operation mode of the display control section 20 is the second mode (S61). In a case where the update control section 26 determines that the current operation mode of the display control section 20 is the second mode (YES at S61), the update control section 26 further determines whether or not a display refresh is necessary (S62). In a case where the update control section 26 determines that a display refresh is necessary (YES at S62), the update control section 26 reads out image data from the storage section 23 so as to start causing the image data to be displayed on the display section 30 (S63), and ends the process. Alternatively, in a case of NO at S62, that is, in a case where the update control section 26 determines that no display refresh is necessary, the series of processes is ended.

At S61, in a case where it is determined that the current operation mode is not the second mode (NO at S61), that is, in a case where it is determined that the current operation mode is the first mode, the process proceeds to S11. Note that the process at S11 is the same as that in Embodiment 1. Then, in a case of YES at S11, a receiving section 21 starts receiving image data, and notifies a sync signal generation section 25 that reception of the image data has been started. Upon reception of the notification, the sync signal generation section 25 generates a vertical sinc signal. Further, the receiving section 21 outputs the image data thus received to both of the update control section 26 and a writing section 22. The update control section 26 supplies, to the display section 30, the image data received from the receiving section 21 and the vertical sinc signal (S64). In this manner, the update control section 26 supplies image data to the display section 30 without intermediation of the storage section 23. Further, the writing section 22 receives image data from the receiving section 21 and writes the image data into the storage section 23. The image data written into the storage section 23 is used for a display refresh when the operation mode of the display control section 20 is the second mode. Thus, the display control section 20 ends the process. In a case of NO at S11, the series of processes is ended.

According to the above processes, the display control section 20 can (i) switch the operation mode at appropriate timing in accordance with an instruction from the host 10, obtain one of image data which is being received and image data which has been stored in the storage section 23, in accordance with the operation mode thus switched, and (iii) cause the image data thus obtained to be displayed on the display section 30. Note that also in the display device 1 of Embodiment 4, once generation or transfer of previous image is completed, generation or transfer of new image data can be started at timing when a given length of period which is not less than a single frame period has passed since a start of the generation or transfer of the previous image data.

[Embodiment 5]

[Configuration of Main Parts of Display Device]

Figure 12:
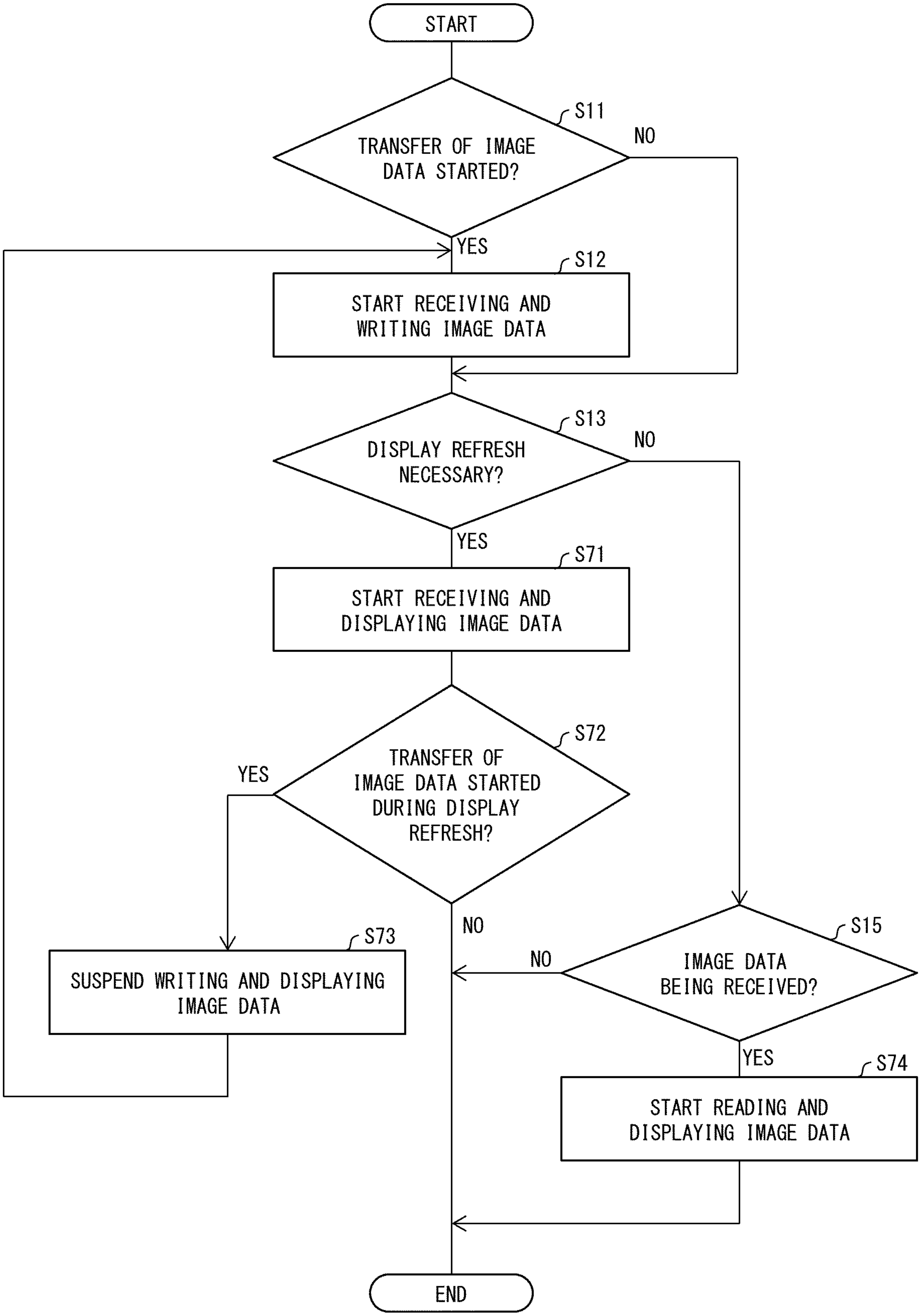
FIG. 12 is a flowchart showing an example of processes carried out by a display control section 20 of a display device 1 in accordance with. Embodiment 5 of the present invention.

The following description will discuss Embodiment 5 of the present invention with reference to FIGS. 1 and 12. For easy explanation, the same reference signs will be given to members each having the same function as a member described in Embodiments 1 through 4, and descriptions on such a member will be omitted. In Embodiment 5, a description will be given on a display device 1 which is configured such that when transfer of image data from a host 10 is started during a display refresh, the display control section 20 suspends the display refresh and causes the display section 30 to display the image data which has been started to be transferred. Since display refresh is to supply, to the display section 30, image data identical to currently displayed image data, suspension of the display refresh does not change how the image data looks to a user.

In Embodiment 5, the display device 1 has the same configuration as that of Embodiment 1, but functions of an update control section 26 are partially different from those of Embodiment 1. When transfer of image data from the host 10 is started during a display refresh, the update control section 26 suspends the display refresh which is being carried out. When not less than a predetermined proportion (e.g., not less than 1/10) of a total amount of the image data which is being received by the display control section 20 has been received, the update control section 26 starts reading out the image data from a storage section 23 via a reading section 24. Processes carried out by the host 10 are the same as those of Embodiments 1 and 3 (FIG. 4).

<Flow of Processes Carried Out by Display Control Section>

FIG. 12 is a flowchart showing an example of a flow of processes carried out by the display control section 20. Processes at S11 through S13 are the same as those in Embodiment 1. In a case of YES at S13, that is, in a case where the update control section 26 determines that a display refresh is necessary, the update control section 26 reads out image data from the storage section 23 so as to start causing the image data to be displayed on the display section 30 (S71). Subsequently, the update control section 26 determines whether or not transfer of new image data from the host 10 has been started during the display refresh (S72). In a case where the update control section 26 determines that the transfer has been started (YES at S72), the update control section 26 suspends reading of image data and supply of the image data to the display section 30 for the display refresh (S73). Further, the receiving section 21 starts receiving the new image data thus transferred and writing the new image data into the storage section S12). Note that since the new image data has been received, the update control section 26 determines at the subsequent step S13 that no display refresh is necessary. In a case where the update control section 26 determines that the transfer has not been started during the display refresh (NO at S72), the update control section 26 goes on completing the display refresh, and ends the process.

In a case where the update control section 26 determines that no display refresh is necessary (NO at S13 the process proceeds to S15. Note that S15 is the same as that of Embodiment 1. In a case where the update control section 26 determines that the receiving section 21 is receiving image data (YES at S15), and when not less than a predetermined proportion (e.g., not less than 1/10) of a total amount of the image data which is being received by the display control section 20 has been received, the update control section 26 starts reading out the image data from the storage section 23 via the reading section 24 (S74). In a case where the update control section 26 determines that the receiving section 21 is not receiving image data (NO at S1 the series of processes is ended.

According to the above processes, the display control section 20 can display transferred image data promptly even during a display refresh.

[Software Implementation Example]

Control blocks of the display device 1 (particularly, the image generation section 11 and the image transferring section 12) may be realized by a logic circuit (hardware) provided in an integrated circuit (IC chip) or the like or may be realized by software as executed by a CPU (Central Processing Unit).

In the latter case, the display device 1 includes: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be made available to the computer via any transmission medium (such as a communication network and a broadcast wave) which enables transmission of the program. Note that the present invention can also be implemented by the program in the form of a computer data signal embedded in a carrier wave which is embodied by electronic transmission.

Note that although each of Embodiments 1 through 5 discussed an example case in which the host and the display control section are realized as individual configurations, the host and the display control section may instead be realized as a single configuration. That is, the host may be configured to carry out operations of the display control section.

[Recap]

A display device (1/100) in accordance with Aspect 1 of the present invention is a display device (1/100) including: a host (10) configured to transfer image data to a display control section (20); and the display control section (20) configured to control display of the image data, the host (10) including: an image generation section (11) configured to generate the image data; and an image transferring section (12) configured to transfer, to the display control section (20), the image data generated by the image generation section (11), a single frame period with respect to a predetermined refresh rate being a single unit period, the image generation section (11) being configured to, upon completion of generation of the image data, start generating, in a case where the generation of the image data for a single frame was completed within less than the single unit period, image data for a subsequent frame after the single unit period has passed since the generation of the image data for the single frame was started, and start generating, in a case where the generation of the image data for a single frame was not completed within less than the single unit period, image data for a subsequent frame any time after the completion of the generation of the image data for the single frame. According to the above configuration, in accordance with timing at which the host completes generating image data, timing for starting generation of image data for a subsequent frame is controlled. This allows the image generation section to generate subsequent image data without being restricted to timing of an integral multiple of a single frame period. Accordingly, even in a case where image generation is delayed, it is possible to reduce delay of display and also to display consecutive image data seamlessly.

In Aspect 2 the present invention, the display device in accordance with Aspect 1 is configured such that when the image generation section (11) completes the generation of the image data, the image transferring section (12) immediately starts transferring the image data to the display control section (20), in a case where no image data is being transferred. According to the above configuration, when the image generation section completes generation of image data for a subsequent frame, transfer of the image data is immediately started. This enables prompt display of image data to be displayed.

In Aspect 3 of the present invention, the display device (1/100) in accordance with Aspect 1 or 2 is configured such that: the display control section (20) includes a sync signal generation section (25) configured to generate a vertical sinc signal any t in accordance with timing at which the image data is received from the image transferring section (12); and the display control section (20) supplies the vertical sinc signal to a display section (30) which is configured to display an image. According to the above configuration, in accordance with timing at which image data is received, the display control section generates a vertical sinc signal and updates content displayed on the display section. Accordingly, the display control section can update displayed content immediately when new image data is received. This enables prompt display of image data to be displayed.

In Aspect 4 of the present invention, the display device (1/100) in accordance with any one of Aspects 1 through 3 is configured such that: the display control section (20) further includes: a receiving section (21) configured to receive the image data from the image transferring section (12); a storage section (23) configured to store therein the image data received; and an update control section (26) configured to read out the image data from the storage section (23) and supply the image data to a/the display section (30); and a speed at which the update control section (26) reads out the image data from the storage section (23) is higher than a speed at which the receiving section (21) writes the image data into the storage section (23). According to the above configuration, reading of image data from the storage section is prevented from being overtaken by writing of the image data into the storage section. Accordingly, the host can freely determine timing for transferring image data. This allows promptly displaying image data even in a case where generation of the image data is delayed.

In Aspect 5 of the present invention, the display device (1) in accordance with Aspect 4 is configured such that in a case where the display control section (20) is receiving the image data from the image transferring section (12), the update control section (26) starts reading out the image data from the storage section (23) when not less than a predetermined proportion of a total amount of the image data has been received. According to the above configuration, the display control section does not start updating displayed content until reception of image data proceeds to a certain extent. This prevents reading of image data from overtaking reception of the image data.

In Aspect 6 of the present invention, the display device (1) in accordance with Aspect 4 is configured such that in a case where the display control section (20) carries out a display refresh on the display section (30) without reception of new image data by the receiving section (21), the receiving section (21) inhibits, for a predetermined period until the update control section (26) starts reading out the image data from the storage section (23), transfer of new image data from the host (10). The above configuration allows preventing a read operation on the storage section from overtaking a write operation on the storage section.

In Aspect 7 of the present invention, the display device (100) in accordance with Aspect 4 is configured such that: the storage section (23) includes a first frame memory (121) and a second frame memory (122); the receiving section (21) stores, in the first frame memory or the second frame memory, the image data received from the host (10); and while the image data is being written into the first frame memory, the update control section (26) starts reading out the image data from the first frame memory in a case where not less than a predetermined proportion of a total amount of the image data has been written into the first frame memory, and starts reading out image data for a previous frame from the second frame memory in a case where less than the predetermined proportion of the total amount of the image data has been written into the first frame memory. According to the above configuration, in a case where a display refresh and reception of image data overlap with each other, whether to carry out a display refresh or display of the image data can be selected appropriately in accordance with an extent of progress of the reception. This allows seamlessly displaying consecutive image data.

In Aspect 8 of the present invention, the display device (1) in accordance with Aspect 4 is configured such that: in accordance with an instruction from the host (10), the update control section (26) operates between two operation modes of: a first mode in which the image data received from the host (10) is supplied to the display section (30) without intermediation of the storage section (23); and a second mode in which the image data stored in the storage section (23) is supplied to the display section (30); and the image transferring section (12) instructs the display control section (20) to switch an operation mode of the update control section (26) to the second mode in a case where transfer of the image data is unnecessary, and instructs the display control section (20) to switch the operation mode of the update control section (26) to the first ode in a case where transfer of the image data is necessary. According to the above configuration, delay caused by temporarily storing image data in the storage section first is reduced in a case of the first mode, and power consumption is reduced due to the lack of data transfer to and from the host in a case of the second mode. Thus, in a case where image data has been received, the display control section immediately causes the image data to be displayed without intermediation of the storage section, and in a case where no image data has been received, the display control section carries out a refresh with use of image data in the storage section. This allows new image data, if any, to be displayed immediately, allows consecutive image data to be displayed seamlessly, and further allows a reduction in power consumption during absence of new image data.

In Aspect 9 of the present invention, the display device (1) in accordance with Aspect 4 is configured such that in a case where the receiving section (21) starts receiving new image data while the update control section (26) is reading out the image data from the storage section (23), the update control section (26) suspends reading of the image data from the storage section (23). According to the above configuration, in a case where transfer of image data is started during a display refresh, the display refresh is suspended, and displayed content is updated with use of the image data which is being received. This allows promptly starting display of image data in a case where a display refresh and transfer of the image data overlap with each other.

A method, in accordance with Aspect 10 of the present invention, for controlling a display device (1/100) is a method for controlling a display device (1/100), the display device including: a host (10) configured to transfer image data to a display control section; and the display control section configured to control display of the image data, the method including: an image generation step (S3) of causing the host (10) to generate the image data; and an image transfer step (S5) of causing the host to transfer, to the display control section, the image data generated through the image generation step (S3), a single frame period with respect to a predetermined refresh rate being a single unit period, the image generation step (S3) being configured to, upon completion of generation of the image data, start generating, in a case where the generation of the image data for a single frame was completed within less than the single unit period, image data for a subsequent frame after the single unit period has passed since the generation of the image data for the single frame was started, and start generating, in a case where the generation of the image data for a single frame was not completed within less than the single unit period, image data for a subsequent frame any time after the completion of the generation of the image data for the single frame. The above method brings about effects similar to those of Aspect 1.

The display device in accordance with the aspects of the present invention may be realized by a computer. In this case, a program for controlling the display device which program realizes the display device with use of a computer by causing the computer to function as sections (software elements) of the display device, and a computer-readable storage medium in which the program is stored, are also encompassed in the present invention.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1, 100: display device
10: host
11: image generation section
12: image transferring section
20, 20*a*: display control section
21: receiving section
22: writing section
23, 23*a*: storage section
24: reading section
25: sync signal generation section
26: update control section
30: display section
121: first frame memory
122: second frame memory

The invention claimed is:

1. A display device comprising:

a host configured to transfer image data to a display control circuit; and the display control circuit configured to control display of the image data, the host including:

an image generation circuit configured to generate the image data; and an image transferring circuit configured to transfer, to the display control circuit, the image data generated by the image generation circuit, a single frame period with respect to a predetermined refresh rate being a single unit period, the image transferring circuit being configured to, upon completion of generation of the image data in the image generation circuit, immediately transfer the image data in a case where the generation of the image data for a single frame was not completed within less than the single unit period, the image generation circuit being configured to, upon completion of generation of the image data, start generating, in a case where the generation of the image data for a single frame was completed within less than the single unit period, image data for a subsequent frame after the single unit period has passed since the generation of the image data for the single frame was started, and start generating, in a case where the generation of the image data for a single frame was not completed within less than the single unit period, image data for a subsequent frame any time after the completion of the generation of the image data for the single frame, the display control circuit being configured to, in a case where the generation of the image data was not completed within less than the single unit period in the image generation circuit, wait for the image data thus delayed and delay display timing for displaying the image data.

2. The display device as set forth in claim 1, wherein when the image generation circuit completes the generation of the image data, the image transferring circuit immediately starts transferring the image data to the display control circuit, in a case where no image data is being transferred.

3. The display device as set forth in claim 1, wherein:

the display control circuit includes a sync signal generation circuit configured to generate a vertical sinc signal any time in accordance with timing at which the image data is received from the image transferring circuit; and the display control circuit supplies the vertical sinc signal to a display circuit which is configured to display an image.

4. The display device as set forth in claim 1, wherein:

the display control circuit further includes:

a receiving circuit configured to receive the image data from the image transferring circuit;

a storage circuit configured to store therein the image data received; and an update control circuit configured to read out the image data from the storage circuit and supply the image data to a/the display circuit; and a speed at which the update control circuit reads out the image data from the storage circuit is higher than a speed at which the receiving circuit writes the image data into the storage circuit.

5. The display device as set forth in claim 4, wherein in a case where the display control circuit is receiving the image data from the image transferring circuit, the update control circuit starts reading out the image data from the storage circuit when not less than a predetermined proportion of a total amount of the image data has been received.

6. The display device as set forth in claim 4, wherein in a case where the display control circuit carries out a display refresh on the display circuit without reception of new image data by the receiving circuit, the receiving circuit inhibits, for a predetermined period until the update control circuit starts reading out the image data from the storage circuit, transfer of new image data from the host.

7. The display device as set forth in claim 4, wherein:

the storage circuit includes a first frame memory and a second frame memory;

the receiving circuit stores, in the first frame memory or the second frame memory, the image data received from the host; and while the image data is being written into the first frame memory, the update control circuit starts reading out the image data from the first frame memory in a case where not less than a predetermined proportion of a total amount of the image data has been written into the first frame memory, and starts reading out image data for a previous frame from the second frame memory in a case where less than the predetermined proportion of the total amount of the image data has been written into the first frame memory.

8. The display device as set forth in claim 4, wherein:

in accordance with an instruction from the host, the update control circuit operates between two operation modes of:

a first mode in which the image data received from the host is supplied to the display circuit without intermediation of the storage circuit; and a second mode in which the image data stored in the storage circuit is supplied to the display circuit; and the image transferring circuit instructs the display control circuit to switch an operation mode of the update control circuit to the second mode in a case where transfer of the image data is unnecessary, and instructs the display control circuit to switch the operation mode of the update control circuit to the first mode in a case where transfer of the image data is necessary.

9. The display device as set forth in claim 4, wherein in a case where the receiving circuit starts receiving new image data while the update control circuit is reading out the image data from the storage circuit, the update control circuit suspends reading of the image data from the storage circuit.

10. A method for controlling a display device, the display device including:

a host configured to transfer image data to a display control circuit; and the display control circuit configured to control display of the image data, the method comprising:

an image generation step of causing the host to generate the image data; and an image transfer step of causing the host to transfer, to the display control circuit, the image data generated through the image generation step, a single frame period with respect to a predetermined refresh rate being a single unit period, the image transfer step being configured to, upon completion of generation of the image data in the image generation step, immediately transfer the image data in a case where the generation of the image data for a single frame was not completed within less than the single unit period, the image generation step being configured to, upon completion of generation of the image data, start generating, in a case where the generation of the image data for a single frame was completed within less than the single unit period, image data for a subsequent frame after the single unit period has passed since the generation of the image data for the single frame was started, and start generating, in a case where the generation of the image data for a single frame was not completed within less than the single unit period, image data for a subsequent frame any time after the completion of the generation of the image data for the single frame, the display control circuit being caused to, in a case where the generation of the image data was not completed within less than the single unit period in the image generation step, wait for the image data thus delayed and delay display timing for displaying the image data.

11. A display device comprising:

a host configured to transfer image data to a display control circuit; and the display control circuit configured to control display of the image data, the host including:

an image generation circuit configured to generate the image data; and an image transferring circuit configured to transfer, to the display control circuit, the image data generated by the image generation circuit, a single frame period with respect to a predetermined refresh rate being a single unit period, the image generation circuit being configured to, upon completion of generation of the image data, start generating, in a case where the generation of the image data for a single frame was completed within less than the single unit period, image data for a subsequent frame after the single unit period has passed since the generation of the image data for the single frame was started, and start generating, in a case where the generation of the image data for a single frame was not completed within less than the single unit period, image data for a subsequent frame any time after the completion of the generation of the image data for the single frame, wherein the display control circuit further includes:

a receiving circuit configured to receive the image data from the image transferring circuit;

a storage circuit configured to store therein the image data received; and an update control circuit configured to read out the image data from the storage circuit and supply the image data to a/the display circuit;

a speed at which the update control circuit reads out the image data from the storage circuit is higher than a speed at which the receiving circuit writes the image data into the storage circuit, and in a case where the display control circuit carries out a display refresh on the display circuit without reception of new image data by the receiving circuit, the receiving circuit inhibits, for a predetermined period until the update control circuit starts reading out the image data from the storage circuit, transfer of new image data from the host.

* * * * *